Aug. 20, 1968     C. B. GWYN, JR     3,397,453
METHOD OF FORMING COMPOSITE ELECTRICAL CONTACTS
Filed Aug. 12, 1965     3 Sheets-Sheet 1
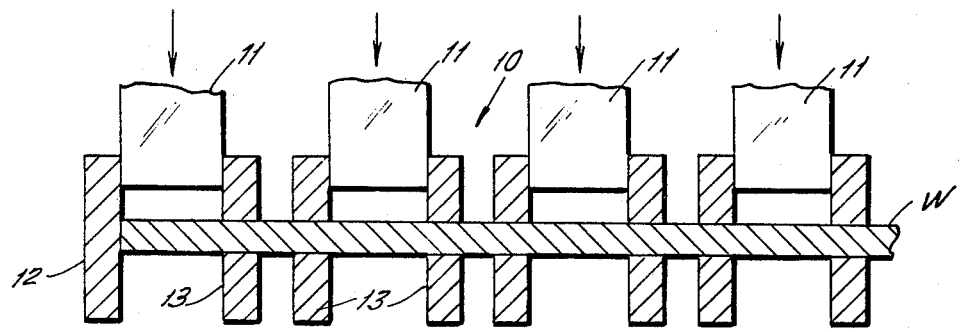
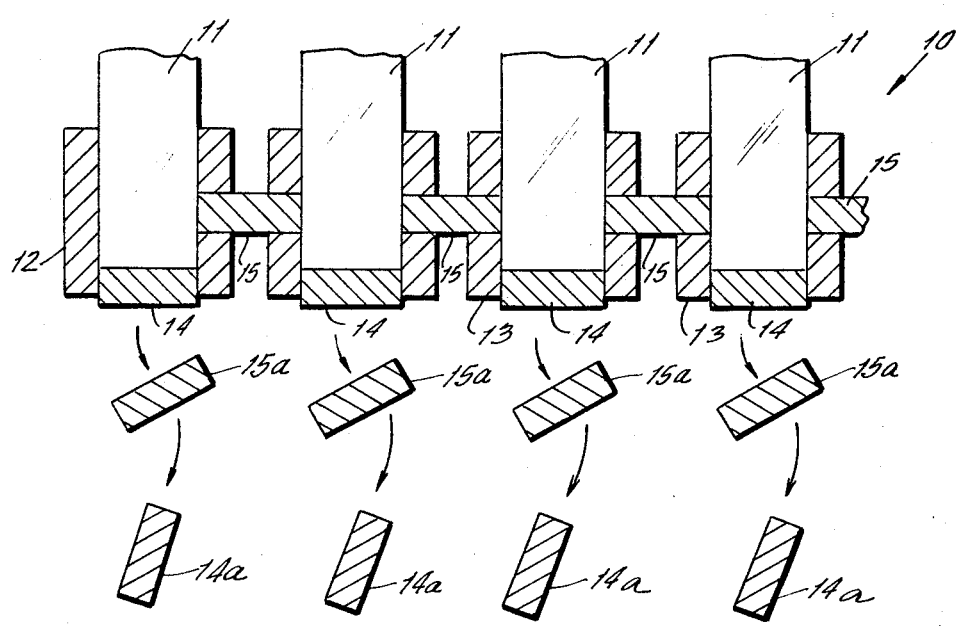
INVENTOR.
CHILDRESS B. GWYN, JR.
BY
OSTROLENK, FABER, GERB & SOFFEN
ATTORNEYS Aug. 20, 1968    C. B. GWYN, JR    3,397,453
METHOD OF FORMING COMPOSITE ELECTRICAL CONTACTS
Filed Aug. 12, 1965    3 Sheets-Sheet 2
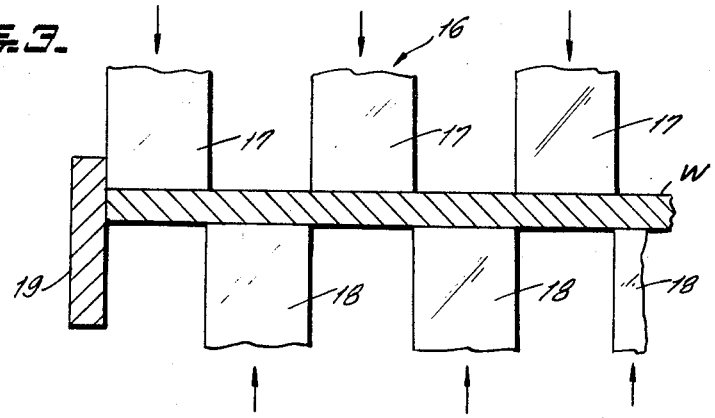
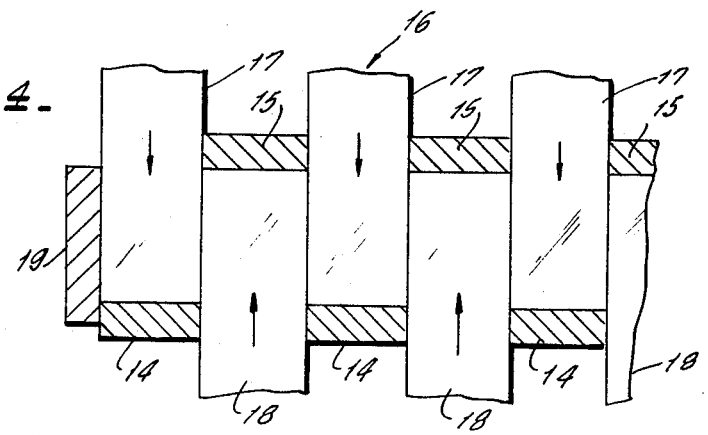
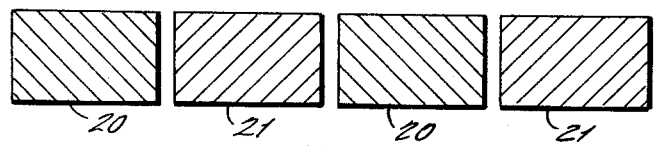
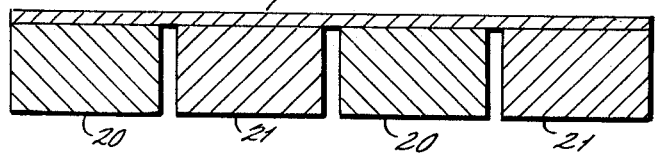
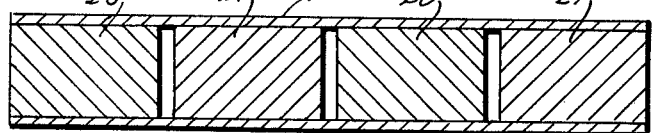
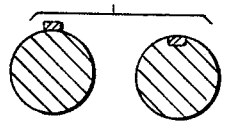
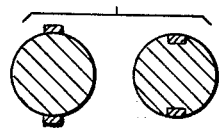
INVENTOR.
CHILDRESS B. GWYN, JR.
BY
OSTROLENK, FABER, GERB & SOFFEN
ATTORNEYS Aug. 20, 1968  C. B. GWYN, JR  3,397,453
METHOD OF FORMING COMPOSITE ELECTRICAL CONTACTS
Filed Aug. 12, 1965  3 Sheets-Sheet 3
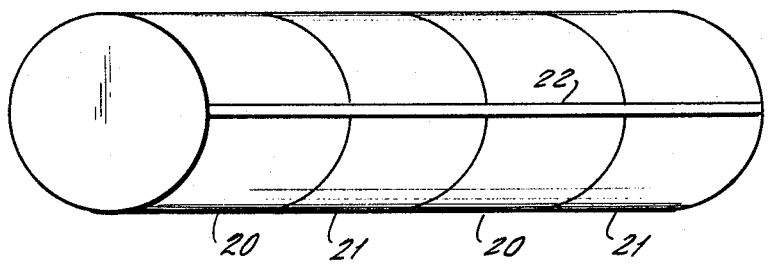
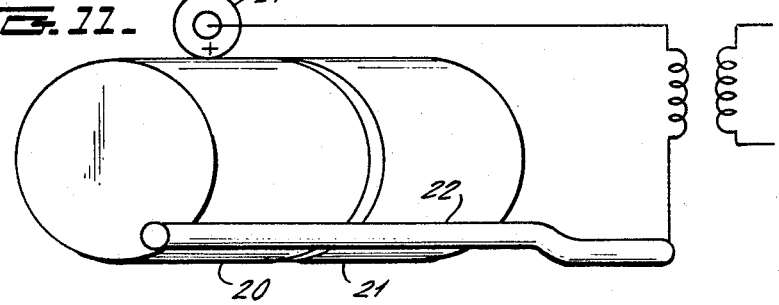
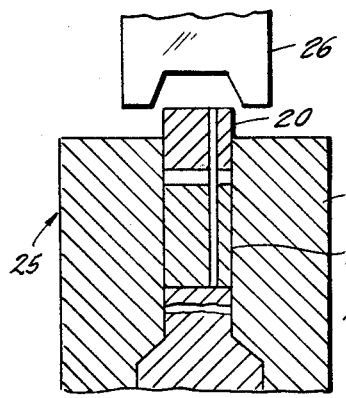
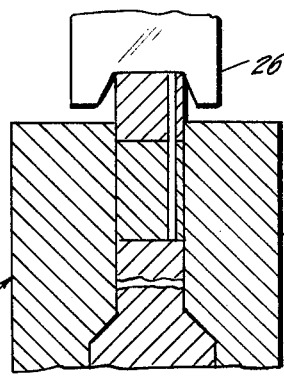
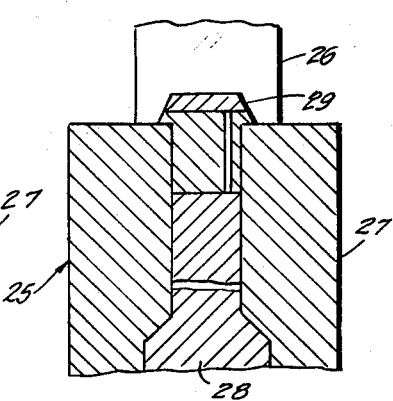
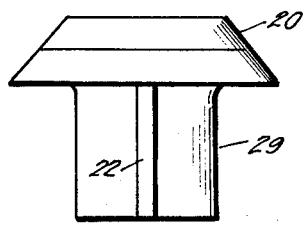
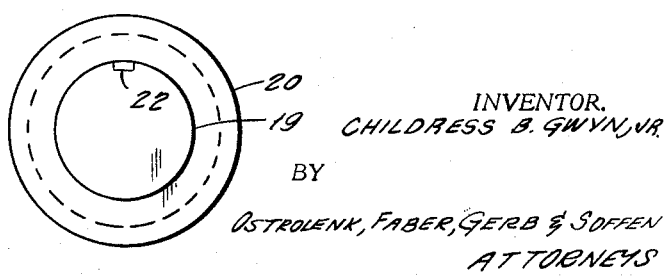
INVENTOR.
CHILDRESS B. GWYN, JR.
BY
OSTROLENK, FABER, GERB & SOFFEN
ATTORNEYS

United States Patent Office 3,397,453
Patented Aug. 20, 1968

3,397,453
METHOD OF FORMING COMPOSITE ELECTRICAL CONTACTS
Childress B. Gwyn, Jr., Export, Pa., assignor to Talon, Inc., Meadville, Pa., a corporation of Pennsylvania
Filed Aug. 12, 1965, Ser. No. 479,071
4 Claims. (Cl. 29—630)

This invention relates to a method for forming integral make and break electrical contact elements, and, more particularly, to a method for producing integrally bonded contacts comprising a contact working face portion and a contact body portion.

Various methods for the manufacture of integrally bonded composite electrical contact elements are well known. Among these are relatively complex processes involving brazing and welding procedures, each of which may also require extensive manipulation of the elements being formed into the finished components.

Recently, methods have been proposed for the cold bonding and shaping of electrical contact elements by means of suitably designed dies. Generally, these procedures include feeding two or more metal wires or strips into a header or press and subsequently cutting or shearing properly proportioned wire segments therefrom. The segments are then successively positioned in properly shaped dies, cold bonded and simultaneously formed into final configuration through the application of one or more suitable blows or pressure in a minimum interval of time. Illustrative of these procedures and methods of manufacture are those in my earlier copending U.S. applications Nos. 72,906 and 856,538, filed respectively on Dec. 1, 1960, and Dec. 1, 1959, and both now abandoned.

Meticulous and exacting controls must be maintained in the formulation of the volumes and shapes of the finished make and break contact elements manufactured in accordance with the foregoing methods. This, in effect, requires precise control of the feed mechanisms for each individual metal wire component and square or sharp cut-off surfaces on the wire segments cut or sheared from the metal wires or strips. Further disadvantages of the aforedescribed methods lie in that for economic operation, these make or break contact elements must be manufactured at high production rates, for example, 100 to 400 bonded and finished shaped assemblies per minute. The foregoing methods of manufacture also require the use of specially designed equipment of highly complex construction, inherently high in initial capital investment, expensive in operation and maintenance and requiring the services of skilled operators.

It is accordingly among the objects of the present invention to provide an improved and economic method for forming composite electrical elements as compared ith previously known methods and procedures.

A further object of the present invention is to provide an improved cold bonding method for forming in a rapid and effective manner a multiplicity of composite electrical elements each comprising a contact working face component and a contact body component.

Another object of the present invention is to provide an improved method of simultaneously shearing or cutting metal wires into a multiplicity of elements for the efficient manufacture of composite electrical elements.

A more particular object of the present invention is to provide an improved and novel method for feeding a multiplicity of metal wire or strip elements to a cold bonding and forming die for the manufacture of make and break electrical contact elements.

These and other objects of the present invention will become readily apparent from the ensuing detailed description and illustrative embodiments.

According to the present invention, it has now been found that integrally bonded electrical contact elements may be produced without the need for expensive apparatus requiring components of a high degree of precision.

In general, the method of the present invention comprises feeding continuous lengths of metal wires into suitable shear or punch elements, cutting the wires into a plurality of predetermined segments for forming the contact working face and contact body portions, respectively, of the desired composite electrical contact elements, and aligning and fastening the segments for the contact working face and body portions in alternating end-to-end relation to form a composite assembly strip. The composite strip, which may be conveniently manipulated, is thereafter fed into a suitable header or like device, wherein the pair of segments for forming each composite element is separated from the assembly strip and subjected to an axial compressive force to effect intermolecular bonding and welding of the respective segments, thereby forming each desired composite contact element.

The method of the present invention has been applied and found generally useful in the manufacture of make-and-break electrical contact elements ranging over a wide variety of shapes and dimensions. Although, as described herein, the present method is illustrated with respect to a rivet-type of electrical contact element, it may be readily understood that other constructions, for example, contact screws and studs are also contemplated by this invention.

The contact working face portion of the make-and-break electrical contact element produced in accordance with the present invention is sheared or cut from a precious or semi-precious continuous wire material. For the purposes of this description, silver may be assumed to be the composition of the contact working face portion, although this component may also be selected from the group consisting of gold, platinum, palladium, copper metals or alloys of silver, gold, platinum, palladium, ruthenium or iridium and others.

The contact body portion of the make-and-break electrical contact element produced in accordance with the present invention is also formed from a continuous wire or strip material. For the purposes of this description, suitable contact body material is assumed to be copper, although it would be satisfactory to utilize nickel, iron or aluminum metals as well as alloys thereof.

Various forms of equipment may be utilized to achieve the intermolecular bonding or cold welding of the present invention. As heretofore described, one particular embodiment of apparatus employed uses a plurality of cutters or multiple shears to cut the metal wires into segments of predetermined length. The segments are conveyed through suitable feed hoppers or mechanisms to a trough and aligned therein in generally end-to-end relation at slightly spaced axial intervals. Suitable controls are provided to assure the segments comprise silver and copper elements in alternate relationship adapted to be supplied to the compression die in that sequence. Thus, at all times the elements fed to the compression die are in the order of silver-copper.

In accordance with the invention, in order to assure that the segments of the material being supplied to the compression dies are properly spaced and controlled, the segments of silver-copper are fastened to each other in alternate sequence, slightly spaced in end-to-end relation. The silver-copper segments are preferably fastened or joined together by means of one or more silver wires or strips seam-welded along the outer surface(s) thereof and longitudinally therealong. It has been found that use of a seam-welded strip having the same composition as the contact working face portion of the composite element is particularly desirable inasmuch as such strip may simultaneously provide a low millivolt electromechanical path along the contact surfaces.

Other fastening means, e.g., coated tapes, paper or plastic outer-tubing, or the like, may also be utilized to fasten the respective contact forming segments in assembled relation to facilitate material handling; such means, however, cannot be as readily and effectively utilized and does not provide as rugged and convenient an assembly strip as provided by use of seam-welding means for fastening the respective segments to one another.

By fastening the individual contact working faces and contact body portion segments together as described above, a continuous assembly strip is provided which may be handled in subsequent manipulations as readily as a single wire. Such strip may even be fed into the compression die of a standard cold-header or coining press. This, of course, eliminates the need for dual feed means for the two or more different wire materials, promotes accuracy in the volume and dimensions of the segments produced and facilitates continuous production of the make-and-break electrical contact elements at high production speeds.

Although the present invention has heretofore been described with respect to the intermolecular bonding or cold welding of two materials, i.e., silver and copper, it will be readily understood that the present method may also be effectively employed for bonding or welding three or more components.

For a fuller understanding of the nature and objects of the present invention, reference is made to the following detailed description of the practice of preferred embodiments thereof, taken in conjunction with the accompanying drawings in which:

FIGURES 1 and 2 are schematic sectional views showing several stages in the formation of a composite intermolecularly bonded contact element in accordance with the invention;

FIGURES 3 and 4 are substantially similar to FIGURES 1 and 2 and show a somewhat modified apparatus used in carrying out this invention;

FIGURES 5 through 9 are cross-sectional views of typical contact working face and contact body portion segments during various stages in the manufacture of the composite intermolecularly bonded contact element formed by the method in accordance with this invention;

FIGURE 10 is an enlarged perspective view of the element shown in FIGURE 6;

FIGURE 11 is a view showing the segments being connected as by seam welding strip 22 with a seam welding apparatus 24.

FIGURES 12 through 14 are schematic sectional views showing several stages in the manufacture of the composite intermolecularly bonded contact element formed by the method in accordance with this invention;

FIGURE 15 is a side elevational view of a typical composite electrical contact rivet formed by the method in accordance with this invention; and FIGURE 16 is a bottom plan view of the composite electrical contact rivet of FIGURE 12.

Referring now in detail to the drawings, FIGURE 1 shows a shear or punching assembly 10 having a plurality of shears 11. A wire W, which may be silver, copper or any material as required, is fed into the shear assembly 10 until it contacts fixed stop 12. The wire W is supported on shear surfaces 13 which have centered holes through which the wire W may be moved. In FIGURE 2, the shear assembly 10 is shown after the shears 11 have completed their cutting stroke past shear surfaces 13, thereby severing the wire into a plurality of segments 14 and 15. The distance between adjacent shear surfaces 13 is preferably equal to the width of the shears 11 so that wire segments 14 and 15 are of equal lengths.

After the shearing operation has been completed, the wire W is advanced into the shear assembly until it again contacts fixed stop 12. This will cause segments 15 to move axially and drop out of the shear assembly. Segments 15a and 14a show previously cut segments dropping downwardly out of the shear assembly 10.

In FIGURES 3 and 4 the shear assembly 16 has been somewhat modified, showing co-acting shears 17 and 18 placed above and below wire W, which has been advanced against fixed stop 19. The wire W is supported on lower shears 18. After closing of the shears, as shown in FIGURE 4, the wire W is severed into a plurality of segments 14 and 15. Segments 14 drop out of the shear assembly, whereas segments 15 may be ejected by the subsequent feeding of wire W into the assembly.

The various segments may then be conveyed into feed hoppers or other dispensing mechanisms, which will align segments 20, which may be silver, in alternating end-to-end relation with segments 21, the later of which may be copper. As shown in FIGURE 5, the segments are placed in a slightly spaced position.

Preferably, the segments are fastened together as illustrated in FIGURES 6 through 9. Thus, in FIGURES 6 and 7, a single silver strip or wire 22 is seam-welded onto the surface of the segments; in FIGURES 8 and 9, a double welded seam 23 is illustrated. A more detailed illustration of the silver strip 22 and the seam welding process may be seen in FIGS. 10 and 11 of the drawings. In particular, FIGURE 11 shows the silver strip 22 being applied in conjunction with the seam welding apparatus 24.

FIGURES 12 through 14 show the adjacent segments 20 and 21 being formed into the finished make-and-break electrical contact element by means of a coining press 25. The press 25 comprises an upper punch 26, a header die 27, and a lower punch 28. The segments 20 and 21 illustrated are joined by silver strip 22 as shown in FIGURE 10. Pressure is applied to the coining press 25, thereby closing upper punch 26 and lower punch 28 and as a result forming electrical contact rivet 29 from segments 20 and 21 through intermolecular bonding at their interface.

FIGURES 15 and 16 illustrate the finished make-and-break electrical contact element, manufactured by the preferred procedure including the use of the intermediate seam-welded strip 22. If the strip 22 is of the same composition as segment 20, e.g., silver, which is now the head of the rivet 29, no contamination occurs on the contact element. Portions of the strip 22 are incorporated in or near the shank and under the head of the composite rivet 29, thereby additionally providing a highly desirable low millivolt electromechanical path when the rivet is employed as an electrical make-and-break contact element.

The foregoing thus shows an improved method for the manufacture of make-and-break contact elements from composite intermolecularly bonded segments. It will be understood, however, that the invention is obviously subject to variations and modifications without departing from its broader aspects. Accordingly, it is intended that the preceding description is illustrative only and should not be construed in a limiting sense.

I claim:
1. A method of forming composite electrical contact elements from continuous lengths of metal wires, each said element incorporating a contact working face portion and integral therewith, a contact body portion, said contact body portions and said contact working face portions being formed respectively, from wires of different metallic compositions, which comprises shearing each said wire into a plurality of segments for forming said contact working face and contact body portions, respectively, aligning said contact working face and contact body portion segments in alternating sequential end-to-end confronting relation, fastening together in closely spaced relation adjacent segments of said aligned contact working face and contact body portions, separating pairs of said segments for forming each said composite element, subjecting each said pair of segments to an axial compressive force to effect intermolecular bonding and welding of said segments and thereby form the composite contact element.

2. The method of claim 1, wherein said contact working face portion segments are constituted of silver, and said contact body portion segments are constituted of copper.

3. The method of claim 1, wherein the adjacent contact working face and contact body portion segments are fastened together by seam welding at least one metallic strip or wire to the surfaces of said segments along a substantial portion of the axial lengths thereof.

4. The method of claim 3, wherein said contact working face portion segments and said metallic strip are constituted of silver, and said contact body portion segments are constituted of copper.

References Cited

UNITED STATES PATENTS

| | | | |
|---|---|---|---|
| 2,501,164 | 3/1950 | Durat | 29—630 |
| 2,723,444 | 3/1955 | Harvey | 29—630 |
| 2,739,369 | 3/1956 | Cooney | 29—630 |

CHARLIE T. MOON, *Primary Examiner.*

R. W. CHURCH, *Assistant Examiner.*